April 15, 1947  M. E. SHANDOR ET AL  2,418,989
FILTER COMPRISING A REVOLVABLE DRUM CONTAINING
A MASS OF LOOSE FILTER MATERIAL
Filed Dec. 13, 1943  3 Sheets-Sheet 1
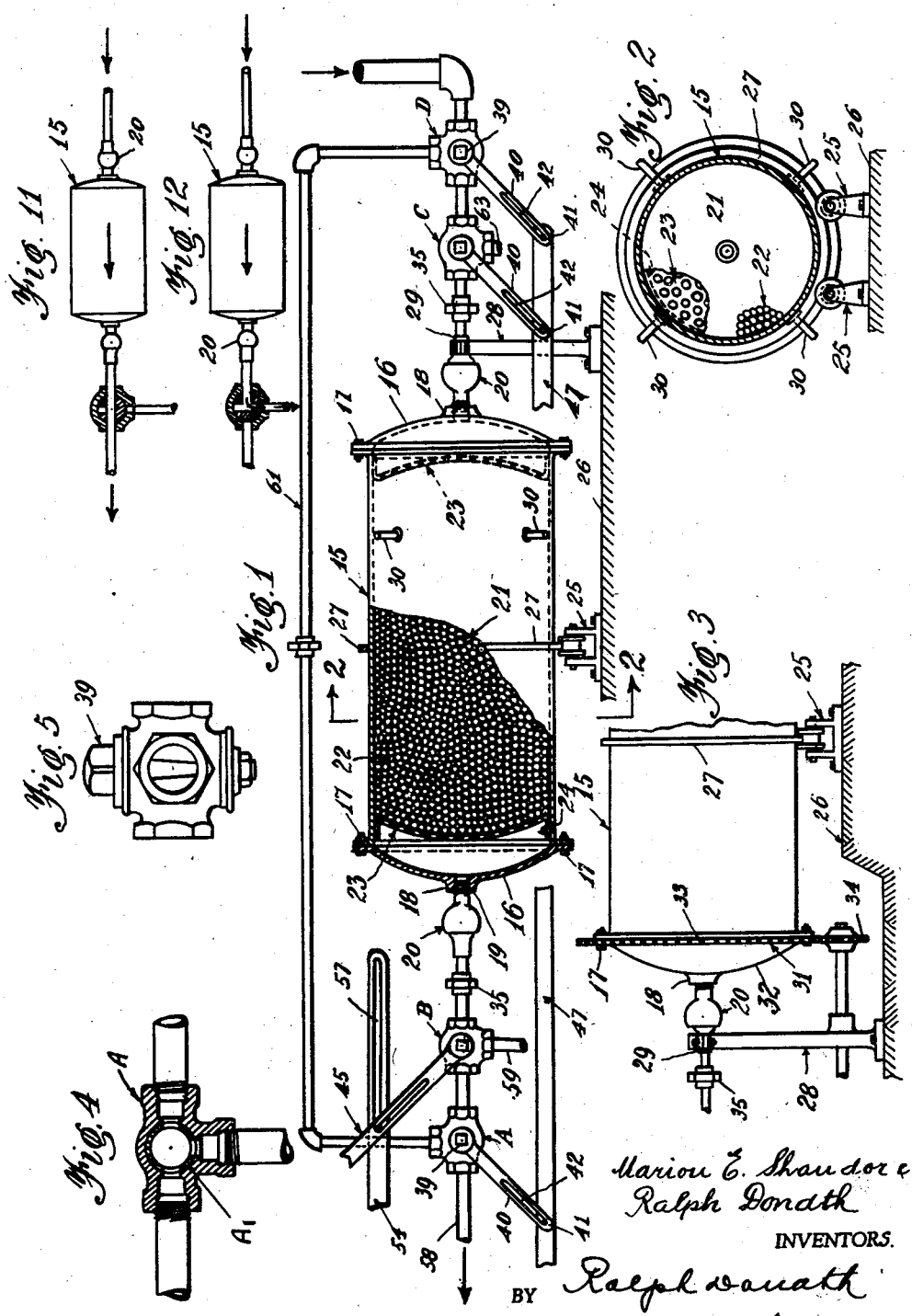
Marion E. Shandor &
Ralph Donath
INVENTORS.
BY Ralph Donath
Attorney.

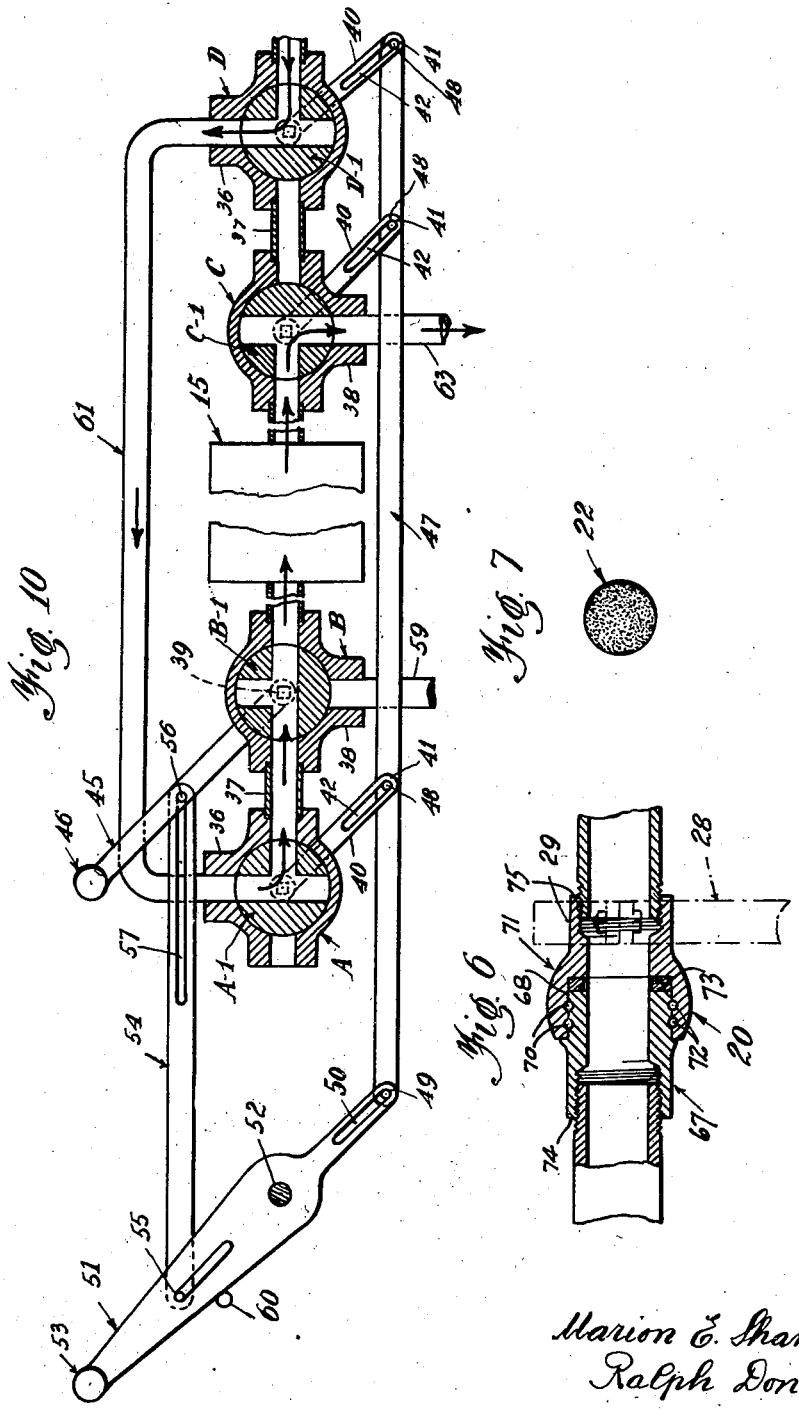

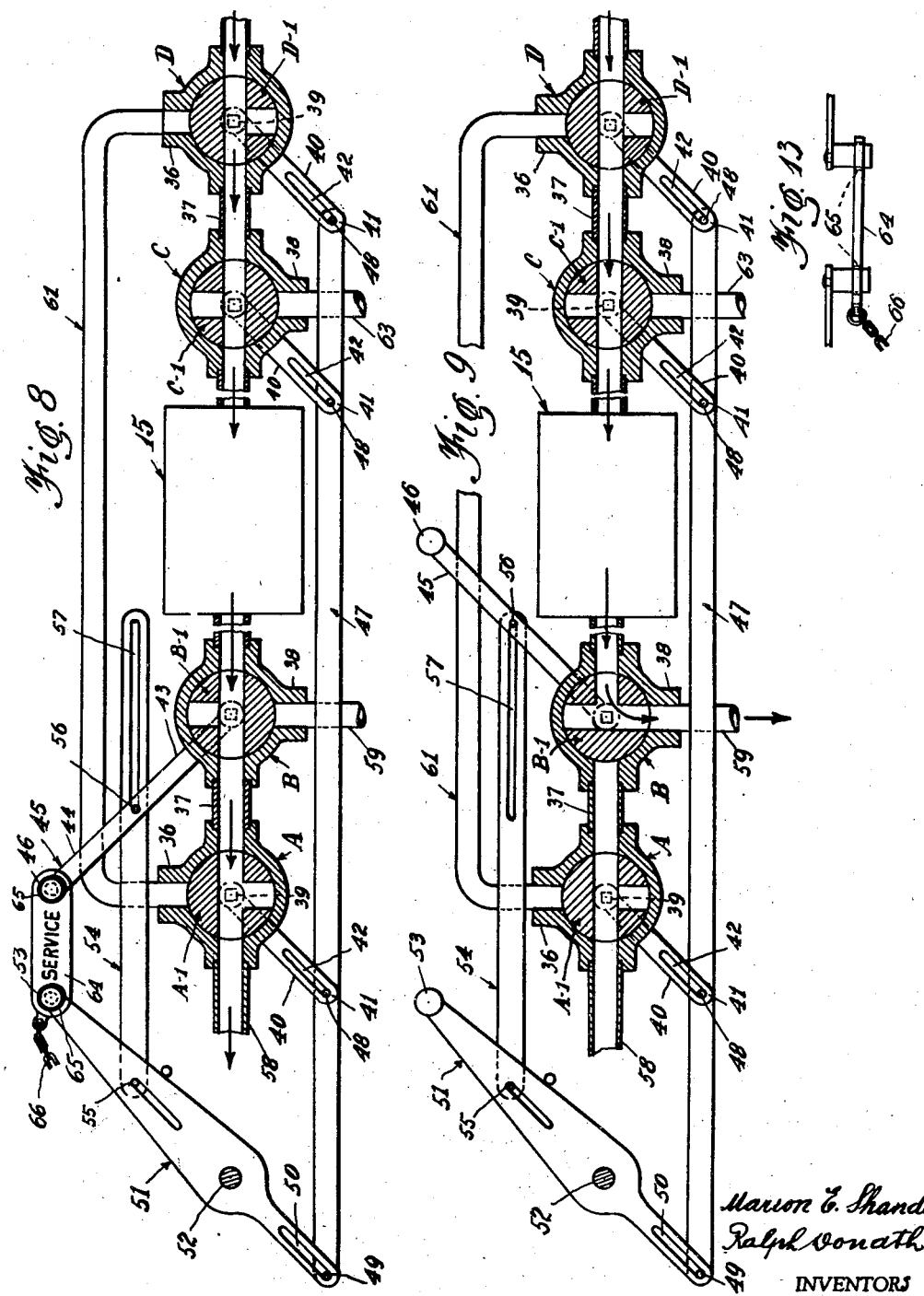

Patented Apr. 15, 1947

2,418,989

UNITED STATES PATENT OFFICE 2,418,989

FILTER COMPRISING A REVOLVABLE DRUM CONTAINING A MASS OF LOOSE FILTER MATERIAL

Marion E. Shandor and Ralph Donath, Pittsburgh, Pa.; said Donath assignor to said Shandor Application December 13, 1943, Serial No. 514,020

5 Claims. (Cl. 210—137)

This invention relates to improvements in liquid purifiers and especially to that type which utilizes ball baffles to remove impurities from water or other liquids and may be considered as additional improvements over the type shown in the pending application filed January 30, 1943, Serial No. 474,089.

One of the objects of the present invention is to provide a device by means of which mechanical impurities of liquids can be rapidly removed.

Another important object of the invention is to provide a liquid purifier of the character described which can be readily kept clean by flushing and back-flushing.

Still another object of the invention is to provide means whereby the container of the purifier is rotated during the flushing or back-flushing operation independent of the piping system.

A further object of the invention is to provide a liquid purifier having a rotatable casing filled with ball baffles and connected at each end with a swing-joint thereby eliminating the troublesome stuffing boxes commonly used for that purpose.

Another object of the invention is to provide a purifier in which the rotatable casing containing ball baffles can be removed or replaced without disturbing the piping system.

Still another object of the invention is to provide a liquid purifier with a rotatable casing containing ball baffles which can be normally flushed or put in condition for service by means of a single valve.

Yet another object of the invention is to provide a purifier which can be normally flushed or back-flushed by the unitary manipulation of a series of three-way valves.

Still another object of the invention is to provide a liquid purifier in which the casing containing ball baffles can be flushed or/and back-flushed after a certain quantity of liquid has been purified.

Another important object of the present invention is to provide a liquid purifier utilizing frosted ball baffles as a cleaning medium.

A further object of the invention is to provide a liquid purifier designed to purify liquids for domestic or manufacturing purposes, which is normally stationary for service and which is rotated during the flushing or/and back-flushing operation whereby the interior of the rotatable casing and the ball baffles are thoroughly cleaned and sediments and other impurities removed thereby assuring a clean interior of the casing and clean ball-baffles at all times.

Another object of the invention resides in a liquid purifier which is simple of construction, inexpensive to manufacture, fool-proof and economic in its operation and simple to install and manipulate.

With these and other objects in view, the invention resides in the certain novel construction, combination and arrangement of parts, the essential features of which are hereinafter fully described, are particularly pointed out in the appended claims, and illustrated in the accompanying drawings, in which:

Figure 1 is a side view of the general arrangement of the invention, with part of the interior of the casing exposed to show the ball baffles and ball retainers as used in this invention.

Figure 2 is a sectional view taken approximately on line 2—2 of Figure 1.

Figure 3 is a fragmentary outline view of a modified form of an end of the casing, showing the end cover rim provided with gear teeth in mesh with a pinion so the casing may be rotated manually or by power during the flushing operation.

Figure 4 is a sectional view of one of the conventional three-way valves as used in this invention.

Figure 5 is an outline view of Figure 4.

Figure 6 is a cross sectional view of a Chiksan swing joint which can be obtained in the open market.

Figure 7 shows one of the frosted ball baffles.

Figure 8 is a diagrammatic view of a general arrangement of the device including four three-way valves and operating levers therefor by means of which the casing can be flushed or back-flushed. In this case the operating levers and valves are shown in a position for service.

Figure 9 shows a diagrammatic view like Figure 8 with the operating levers and valves in a position for normal or straight flushing.

Figure 10 is a diagrammatic view like Figures 8 and 9 showing the operating levers and valves arranged for back-flushing.

Figure 11 shows a diagrammatic view of a simple purifier installation using a single three-way valve, the valve being shown in a position for service.

Figure 12 is a diagrammatic view like Figure 11 with the valve set for flushing.

Figure 13 is a top view of the retaining plate applied to the knobs of the operating levers.

The present invention has particular reference to a liquid purifier designed to efficiently separate impurities from the liquid used for domestic or manufacturing purposes and has special provisions for removing the film adhering to the ball baffles and the accumulated sediments in the casing by flushing or/and back-flushing the ball baffle filled casing while rotating so as to render the drawn liquid free from dirt or other foreign matter.

Referring to the drawings in detail and particularly to Figures 1 and 2, 15 indicates a horizontally disposed, cylindrical casing or container provided at each end with an outwardly arched end member 16 detachably secured to the casing 15 by bolts 17, or otherwise. Each of said end members 16 is provided with a central boss 18 having a tapped aperture 19 to receive one end of a swing joint of standard make, such as for instance the well known Chiksan swing joint indicated by the numeral 20 and detailed in Figure 6. This swing-joint comprises an inner male member 67, the annular portion 68 thereof provided with two parallelly disposed ball race-ways 69 which are in alignment with similar race-ways 70 of the female member 71 when assembled. Balls 72 may be inserted in the race-ways in any suitable manner. In order to prevent leakage a packing 73 is inserted between the male and the female members 67 and 71 respectively. The outer ends 74 and 75 of said members are internally threaded, as shown. Either end, or both ends of the members may rotate, as will be understood. At this time it should be mentioned that by using swing joints the undesirable stuffing boxes are eliminated.

The interior 21 of said casing 15 is filled with ball baffles 22 of any desirable material, preferably frosted or of rough surface because it has been found by extensive experiments that impurities in the liquid will not easily adhere to the surface of a smooth ball as to a rough surfaced one, but on the other hand, it is more difficult to remove the film from a rough surfaced ball than a smooth one, but this disadvantage is fully overcome by the present invention which provides for flushing or/and back flushing of the ball filled container while the latter is being rotated.

Should it be desired to remove the ball filled casing 15 from the other portion of the device without disturbing the remaining structure it is only required to remove the bolt-connections 17 and lift the casing out of engagement with the end-members 16. In order to always retain the ball baffles 22 compactly in the casing, each end of the casing is provided with a foraminated arched retainer 23 having an outwardly extending cylindrical flange 24 which snugly fits in the interior of casing 15.

Where very large purifier installations are used, such as for manufacturing purposes and the weight of the casing 15 with its ball baffles is very considerable a pair of rollers 25, secured to the floor 26 are provided which engage a circular rail 27 welded around the exterior of the casing in a manner as shown in Figures 1 and 2, thereby relieving the strain on the swing joints 20.

For larger sizes in addition to the rollers 25, pedestals 28 may be used which are clamped around the outer end 29 of the swing joints 20 and suitably secured to the floor 26.

At this time it should be mentioned that the casing 15, including the ball baffles 22, is not intended to be rotated during the filtering process or service. Such would completely defeat the proper operation of the device, as will be understood.

The casing may be manually rotated, while flushing, by means of handle bars 30 radially welded to the exterior of the casing or, as for instance shown in Figure 3 the casing may be rotated by hand or motive power. For that purpose the flange 31 of one of the end members 32 is provided with teeth 33 forming a gear, which meshes with a pinion 34 supported in a pedestal 28 in any suitable manner.

As heretofore stated one of the main features of the invention is that the casing 15 including the ball baffles 22 can be thoroughly cleaned without requiring the removal of the baffles from the casing. This could be accomplished, especially in small installations with a single three-way valve such as shown detailed in Figures 4 and 5 and applied as shown in Figures 11 and 12.

Referring now to Figures 8, 9 and 10 inclusive, these figures represent diagrammatic views of the device and are intended to show the various positions of the valve-cores and levers in which Figure 8 shows the device set for service, Figure 9 for normal or straight flushing and Figure 10 for back flushing.

The present installation for normal and back flushing includes four three-way valves A, B, C and D of standard make in which the valves A and B are connected to the swing joint 20 at one end of the casing 15 and valves C and D to the swing joint 20 at the opposite end of the container as shown in Figure 1.

For convenient attachment of the valves to the swing joints a union 35 may be used, as shown. It will be noted that valves A and D are attached to the pipe line with the center outlet 36 directed upwardly, while valves B and C have the center outlet 38 directed downwardly. Pipe nipples 37 are used to connect the valves and swing joints as shown.

In order to turn the valve-cores A—1, C—1 and D—1 of valves A, C and D, the exposed square shanks 39 (Figure 5) of the valve cores are provided with uniform key-levers 40 which are securely pinned to the shanks 39 while the free ends 41 are provided with an elongated slot 42. The square shank 39 of the valve core B—1 of valve B is also provided with a key-lever 43 of similar design as levers 40 but differs from the latter in that the free end 44 has no slot and is extended to form the operating lever 45 having a knob 46 or other suitable gripping means.

Levers 40 of valves A, C and D are attached to a horizontally arranged connecting bar 47 by means of pin connections 48, or otherwise. The said connecting bar 47 extends at one end and has a pin connection 49 adapted to operate in the slot of the lower end 50 of the main operating lever 51. The latter oscillates on a pin 52 and extends outwardly in alignment with the lower end 50 previously described to form the main operating lever 51 which may be manipulated by a knob 53, or otherwise.

Operating levers 45 and 51 are joined together by means of a connecting rod 54 on pin connections 55 and 56. Connecting rod 54 is provided at the end which connects to the operating lever 45 with an elongated slot 57.

Referring now to Figure 8 of the drawings which illustrates a diagrammatic view of the device showing the normal or service position of the ports of the valve cores A—1, B—1, C—1 and D—1 of the valves A, B, C and D respectively.

In service position (Figure 8), the knob 53 of the main operating lever 51 and the knob 46 of the operating lever 45 are in close proximity to each other, as shown, and in order to assure that the valves are properly set and remain so during service, provision is made whereby the two knobs 53 and 46 are retained in that position by a simple retaining device as shown in Figures 8 and 13, comprising a flat plate 64 which is provided with a pair of circular holes 65 approximately the same distance apart as the knobs when in service position. Of course the holes 65 must be slightly larger than the diameter of the knobs so as to permit easy attachment to the knobs.

For convenience, the word "Service" may be stamped or painted on the front of the plate so it is visible to the operator. One end of a chain 66 may be secured to the plate 64 while the free end is secured to a convenient place near the knobs so as to avoid losing the plate. Obviously, the plate 64 must be removed from the knobs when flushing or back flushing of the casing to permit the operating levers 51 and 45 to be moved.

The operation of the device as described above is as follows:

The liquid enters through valve D, as indicated by the arrow, through valve C after which it goes through union 35, the Chiksan swing joint 20 thence into the casing 15 after which the liquid percolates between the ball baffles 22 from where it passes through swing joint 20, union 35, through valves B and A and finally through pipes 58 into the service line.

In order to normally or straight flush the casing 15 including the ball baffles 22, operating lever 45 is moved to the right, as shown in the diagrammatic view in Figure 9. It will be noted that by moving the lever 45 to the right all other levers remain in the normal position which is due to the elongated slot of connecting lever 54 in which the pin connection 56 moves.

In the diagrammatic arrangement shown in Figure 9 the operation is as follows:

The liquid enters through valve D as indicated by the arrow, thence through valve C, union 35 and the swing joint 20 from which it enters the casing 15 percolating between the ball baffles 22 (purifying material) from where it passes through the swing joint 20, union 35 and through valve B, in which the core B—1 has assumed a position as shown in Figure 9, and through pipe 59 into the sewer (not shown).

Figure 10 shows a diagrammatic view of the device with the valves in a position for back flushing the container and ball baffles. To accomplish this, the main operating lever 51 is moved to the left until it strikes the stop pin 60 which causes the operating lever 45 to move the same distance with lever 51 which in turn returns the valve core B—1 to its normal position as shown for service in Figure 8. By moving the main operating lever 51 for approximately ninety degrees as shown in Figure 10, the levers 40 attached to the valves A, C and D have turned the valve cores A—1, C—1 and D—1 for ninety degrees and into position for back flushing.

In this arrangement, the liquid enters through valve D as shown by arrow and through the bypass pipe 61, through valves A and B thence through union 35, swing joint 20 after which it enters the casing 15 and percolates between the ball baffles 22, then passes through swing joint 20, union 35 through valve C and finally through pipe 63 to the sewer (not shown).

After the container, including the ball baffles has been thoroughly flushed and/or back flushed as described, the main operating lever 51 is returned to its normal or service position as shown in Figure 8, while the operating lever 45, due to its slotted pin connection remains in normal position. Thus the device is again ready for service. Operating levers 45 and 51 are again in a position as shown in Figure 8, the retaining plate 64 is slipped over the knobs 46 and 53 of the levers 45 and 51 respectively and the device is again set for service.

Of course, as mentioned before, the casing 15 is being rotated only during the flushing and/or back flushing operation, thereby subjecting the ball baffles to continuous violent agitation and causing the film of impurities adhering to the surface of the ball baffles, while in service, to be removed and any cakes of foreign matter deposited on the interior walls of the container to loosen after which all impurities are drained to the sewer.

Obviously, the container is made of a capacity suitably proportioned to the size of service pipes and the quantity of the ball baffles depends largely on the condition of the liquid.

The apparatus may be mounted on the floor, or in crowded condition the device may be suspended on the ceiling and while the container or casing is shown and described as horizontally mounted it will be understood that the same can be arranged vertically by minor changes.

In conclusion it is pointed out that in a method and device herewith illustrated and described provision is made to thoroughly and quickly purify liquids at relatively small expense and flush and back flush the ball filled container in a minimum of time. It is also apparent that anyone can manipulate the device on account of the foolproof arrangement for flushing and/or back flushing.

This invention is susceptible to many variations in its form, proportions and minor details of construction, and the right is herein reserved to make such changes as properly fall within the terms employed in the definitions of the invention constituting the appended claims.

We claim:

1. A liquid purifier rotatably interposed in a waterline comprising a cylindrical casing having flanged ends; detachable end-members for said flanged end; liquid supply pipes at one end of said detachable end members and liquid discharge pipes at the other end of said detachable end members; each of said members provided with a centrally disposed rotatable fluid-tight joint; rough ball baffles in said casing and means for compactly retaining said baffles in said casing, said means positioned below the flanged ends of said casing thereby permitting the cylindrical casing, including the ball baffles, to be removed from said end members without detaching same from the waterline.

2. A liquid purifier rotatably interposed in a waterline comprising a cylindrical casing having flanged ends; detachable end-members for said flanged ends; liquid supply pipes at one end of said detachable end members and liquid discharge pipes at the other end of said detachable end-members; each of said members provided with a centrally disposed rotatable fluid tight joint; rough ball baffles in said casing and means for compactly retaining said baffles in said casing, said means positioned below the flanged ends of said casing thereby permitting removal of said cylindrical casing, including the ball baffles, from said end-members without detaching same from the waterline; said means including an outwardly arched foraminous ball baffle retainer having an outwardly extending cylindrical flange adapted to be secured to the inner wall of said casing, the outer apex of said arched retainer arranged below the face of the flanged ends of said casing, including the ball baffles, from said end-members without requiring to detach same from the water line and manual means for rotating said purifier.

3. A liquid purifier rotatably interposed in a waterline comprising a cylindrical casing provided at each end with detachable end-members, one of said end-members connected to an inlet line and the other end-member connected to an outlet line; each of said end-members provided with an outwardly extending, centrally disposed pipe connected to one end of a rotatable fluid-tight joint; a pair of three-way valves serially connected to the other end of each of said rotatable joints, the three-way valves adjacent the rotatable joints connected to a sewer line and the outer three-way valves connected to a by-pass line and means to set the three-way valves selectively in position whereby the stream flows from the inlet through the first pair of valves, through the purifier and thence through the second pair of valves to the outlet line for service, or to direct the stream from the inlet line through the first pair of valves, through the purifier and through the first of the second pair of valves to the sewer line for normal flushing or to direct the stream from the inlet line through the first valve of the first pair of valves through the by-pass pipe, through both of the second pair of valves, through purifier and thence through valve adjacent the rotary joint at inlet end for back-flushing.

4. A liquid purifier rotatably interposed in a waterline comprising a cylindrical casing provided at each end with a detachable end member, one of said end members connected to an inlet line and the other end member connected to an outlet line; each of said end members provided with an outwardly extending, centrally disposed pipe connected to one end of a rotatable fluid-tight joint; a pair of three-way valves serially connected to the other end of each of said rotatable joints, the three-way valves adjacent the rotatable joints positioned with the center outlet facing downwardly and connected to a sewer line; the outer three-way valves positioned with the center outlet facing upwardly and connected to a by-pass pipe; the outer three-way valves and the three-way valve adjacent the rotatable joint at the inlet end of the purifier having its valve cores interlinked with a connecting bar and the valve core of the three-way valve adjacent the rotatable joint at the outlet end provided with an operating lever; another connecting bar pivotally attached to said operating lever and a rockably mounted main operating lever pivotally connecting the free ends of both of said connecting bars, all arranged to set the three-way valves selectively and simultaneously in position for service or to direct the stream in either direction for normal flushing or back flushing of the purifier; means for rotating the latter during flushing or back flushing and means to lock the two operating levers when in position for service.

5. A liquid purifier rotatably interposed in a waterline comprising a cylindrical casing provided at each end with a detachable end member, one of said end members connected to an inlet line and the other end member connected to an outlet line; each of said end members provided with an outwardly extending, centrally disposed pipe connected to one end of a rotatable fluid-tight joint; a pair of three-way valves serially connected to the other end of each of said rotatable joints; the three-way valves adjacent the rotatable joints positioned with the center outlet facing downwardly and connected to a sewer line; the outer three-way valves positioned with the center outlet facing upwardly and connected to a by-pass pipe; the outer three-way valves and the three-way valve adjacent the rotatable joint at the inlet end of the purifier having its valve cores interlinked with a connecting bar and the valve core of the three-way valve adjacent the rotatable joint at the outlet end of the purifier provided with an opertaing lever; another connecting bar pivotally attached to said operating lever and a rockably mounted second operating lever pivotally connecting the free ends of both of said connecting bars, all arranged to set the three-way valves selectively and by a single movement of one of said two operating levers into three distinctive positions, that is in a position for service, or in a position to direct the stream for normal flushing or back-flushing of the purifier and unitary means to prevent movement of said two operating levers when in position for service.

MARION E. SHANDOR.
RALPH DONATH.

REFERENCES CITED

The following references are of record in the file of this patent:

UNITED STATES PATENTS

| Number | Name | Date |
|---|---|---|
| 343,251 | Neracher | June 8, 1886 |
| 662,556 | Brix | Nov. 27, 1900 |
| 1,047,534 | Joseph | Dec. 17, 1912 |
| 136,364 | Conger | Mar. 4, 1873 |
| 2,093,311 | Craig | Sept. 14, 1937 |
| 2,330,197 | Allen et al. | Sept. 9, 1943 |
| 312,527 | Spitznagel | Feb. 17, 1885 |
| 1,499,600 | Smith | July 1, 1924 |

FOREIGN PATENTS

| Number | Country | Date |
|---|---|---|
| 4,547 | British | Mar. 24, 1888 |
| 591,099 | French | Apr. 1, 1925 |